July 25, 1944.  M. CARTER  2,354,433
METHOD OF FORMING RUBBER ARTICLES
Filed Aug. 2, 1941
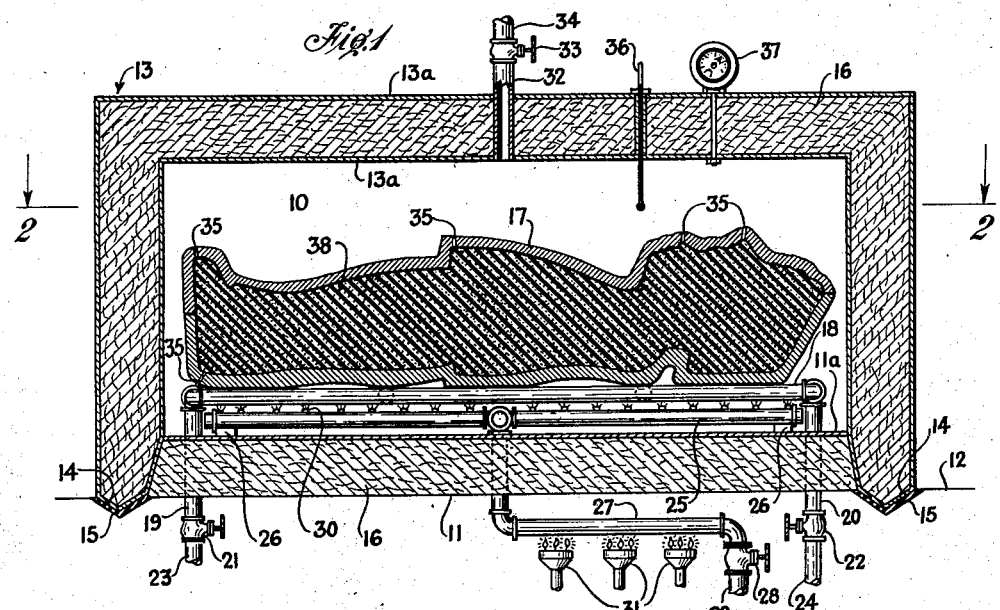
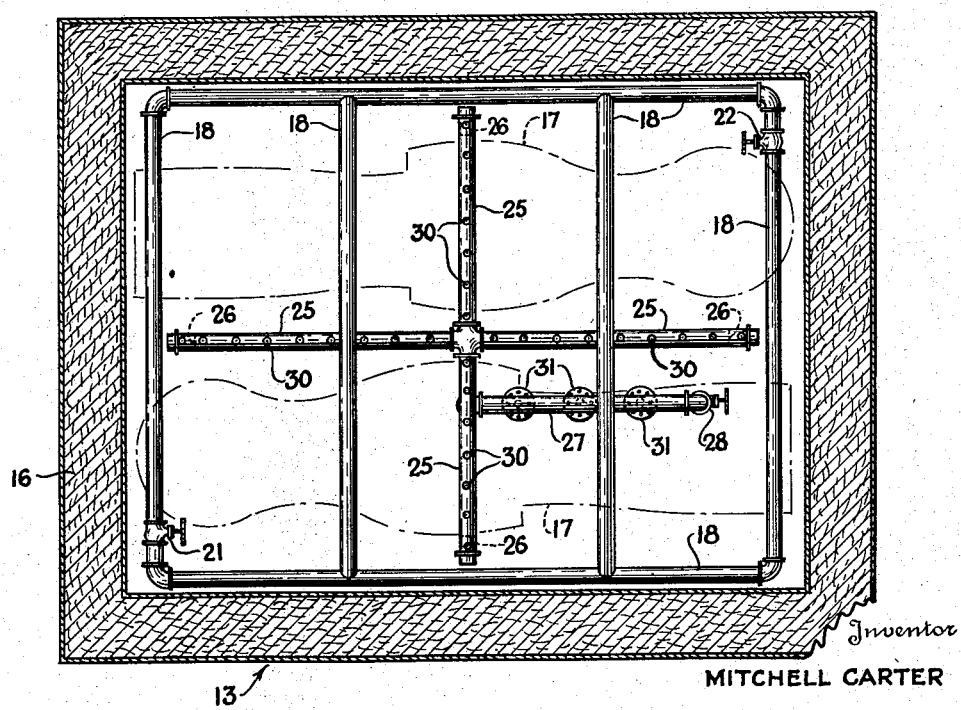
MITCHELL CARTER Patented July 25, 1944

2,354,433

UNITED STATES PATENT OFFICE 2,354,433

METHOD OF FORMING RUBBER ARTICLES

Mitchell Carter, Yardley, Pa., assignor to The Firestone Tire & Rubber Company, Akron, Ohio, a corporation of Ohio Application August 2, 1941, Serial No. 405,209

6 Claims. (Cl. 18—53).

This invention relates to the formation of rubber articles, especially to forming cellular rubber articles from latex.

Heretofore in forming rubber articles directly from latex it has taken a relatively long period to vulcanize such articles, due to the freshly gelled rubber having appreciable water therein. Obviously, during vulcanization this water, as well as the rubber, had to be heated in order to vulcanize the rubber. Then, too, particles of wet rubber do not bond very well as they are vulcanized, because the water in the carteroids is holding the rubber particles apart.

The general object of the present invention is to provide an improved method for vulcanizing cellular latex rubber articles and to provide rubber articles, made from latex, having improved physical properties.

A further object of the invention is to dry cellular latex rubber rapidly and completely before it is vulcanized, which rubber may be compounded with standard compounding ingredients.

The above and other objects will be manifest from the following specification.

Any natural or artificial dispersion of rubber or rubber-like material may be used in practice of the invention, but natural latex is the type of dispersion usually used.

The latex used is compounded with suitable gelling, and vulcanizing ingredients, frothed in any desired manner, and placed in a mold, or other container used to form the desired rubber article. After the latex froth is thoroughly gelled, the rubber-containing mold is then positioned in a chamber wherein a vacuum can be set up, or the mold may be placed in such chamber and then filled as disclosed in my co-pending application Serial No. 405,211, filed August 2, 1941. Then, a vacuum is set up in the inclosed chamber and the chamber is heated to dry the cellular latex rubber gel. By setting up an absolute pressure of 7.5 pounds per square inch in the chamber, any water contained in the cellular latex gel will boil at 180° F. and be driven rapidly therefrom. If the water is to be boiled from the latex at a lower temperature, higher vacuum should be set up in the chamber. The chamber used, as well as the vacuum creating means and heating means may be of any desired construction. One example of apparatus which may be used to practice the invention, which apparatus may be of semi-cylindrical, or semi-spheroidal shape, is illustrated in the accompanying drawing, in which:

Figure 1 is a vertical sectional view of apparatus suitable for practicing the method of the invention; and Figure 2 is a sectional view taken on lines 2—2 of Figure 1, the positions of the molds being indicated by broken lines.

Referring to the drawing, a vulcanizing chamber 10 is shown, of any desired size. The chamber has a base portion 11, that is mounted on a support. A chamber cover 13 that is adapted to fit into recesses 14, 14 in the base 12 so as to seal the edges of the base portion. Suitable gaskets 15, 15 may be positioned in recesses 14, 14 to aid in sealing the chamber to make it airtight. The base member 11 and cover 13 may be formed from any suitable material, and, in this instance, are made of light material comprising a metallic inner wall 11a and metallic inner and outer walls 13a, 13a respectively, between which is positioned any suitable insulating material 16, such as rock wool. One or more molds 17, 17 for receiving the latex to be gelled and vulcanized therein, are supported within the chamber by a pipe framework 18, which may also serve to heat the mold and the chamber. The pipe framework 18 is connected to and supported by inlet and exit pipes 19 and 20, provided with valves 21 and 22. These valves are connected in turn to pipes 23 and 24, respectively, which connect the framework 18 to a suitable source (not shown) of steam or other heating fluid and to a discharge point (not shown), so that the desired heating fluid may be circulated through framework 18. Located directly beneath the molds and the framework 18 is a T-shaped member 25, of pipe construction, which extends substantially the length and width of the vulcanizing chamber. The ends of the member 25 are supported on blocks 26, 26 resting on base portion 11 of the chamber. The member 25 is also connected to and supported near its central portion by a pipe 27. Pipe 27 is connected to a valve 28, which valve is also connected to a pipe 29 that leads to a source (not shown) of steam or air under pressure. The upper surfaces of the member 25 are provided with numerous openings 30, 30 for allowing the steam or air within the member to escape into chamber 10. Suitable burners 31 may be positioned beneath a portion of pipe 27 in order to heat or superheat the air or steam passing through the pipe, to the end that the vulcanizing chamber and its contents may be rapidly heated. Extending through cover 13 is a pipe 32, which is connected through a valve 33 to a pipe 34. The latter pipe is connected to a suitable vacuum source (not shown), which may be utilized to produce a sub-atmospheric pressure in the chamber 10 and draw vaporized moisture from the interior of molds 17, 17 through vents 35, 35 thereof. The chamber cover 13 may also be provided with a thermometer 36 and a pressure indicator 37 to aid an operator in carrying out the method of the invention.

The method is preferably carried out by first filling the molds 17, 17 with a suitable latex composition and gelling the composition in the mold. When the latex composition is foamed or otherwise suitably treated prior to the gelling thereof, a sponge rubber 38 is formed in the mold. The gelled latex rubber in the mold is then dried in chamber 10 by heating the latter and its contents by circulating steam or other heating fluid through pipe framework 18 and/or introducing air or steam, preferably superheated, by means of the T-shaped member 25. In order to remove water rapidly from the gelled rubber, a vacuum is set up in the chamber, to the extent heretofore indicated, by suitably opening valve 33. The heating under vacuum is continued until the gelled rubber is dried, whereupon, the pressure within chamber 10 is allowed to rise up to or above atmospheric pressure by connecting pipe 34 with the atmosphere or by closing valve 33. The heating is then continued until the rubber in molds 17, 17 is vulcanized.

When the gelled latex is being dried, it may be desirable to circulate dry, warm air, or super heated steam prepared under the pressure used in the drying chamber, in the chamber to dry the latex rubber and, if so, only such volume of air as will establish the desired vacuum in the chamber may be admitted into same and circulated therethrough.

By establishing an appreciable vacuum in the chamber, so that the boiling temperature of the water in the cellular latex rubber gel is reduced to around 180° F., substantially any desired accelerators and other vulcanizing ingredients may be compounded with the latex without having any appreciable vulcanization of the latex occur until after the gelled rubber has been thoroughly dried. This is important, since a feature of the invention resides in drying the cellular latex rubber completely before vulcanizing same and it gives enhanced tensile strength to the rubber produced, as well as improving other physical properties in the rubber.

Most latex rubber is compounded to vulcanize in about one hour at about 212° F. and it is known that a reduction of about 20° F. substantially doubles the vulcanization period. Since the maximum drying period for even a large rubber article would not be over about one-half hour, and the vulcanization period required at a temperature of about 180° F. is usually about 3 hours, it will be seen that no appreciable vulcanization of the rubber occurs while it is being dried. The temperature of the cellular rubber will not go above the boiling point of water at a given pressure, as long as any water remains therein. At most, the rubber would only be semi-vulcanized and rubber particles will bond substantially perfectly at any stage in the vulcanization period except in the final stages thereof, so that desirable results are obtained.

After the latex rubber is thoroughly dried, the chamber should be allowed to return to atmospheric pressure, or even above such pressure if desired, and steam or hot air can be circulated therein in order to vulcanize the rubber.

A feature of the invention is that cellular rubber dried in accordance with the invention has all of the water removed therefrom whereas cellular rubber vulcanized by ordinary methods still has appreciable water in the carteroids thereof, which water is difficult to drive out of the rubber. Hence cellular rubber made as outlined herein can be dried appreciably faster than other types of cellular rubber after the final washing operation to which all cellular rubber is subjected, since with the more perfect bonding of the rubber particles, the carteroids are materially reduced in size or practically eliminated, and very little, if any, water re-enters the carteroids in this washing operation.

The invention is adapted to be used in the production of either solid or cellular rubber articles from latex, but is especially suited for use in producing cellular rubber of improved physical properties.

It will be seen that an improved vulcanization method for latex rubber articles has been provided by the invention, and the objects thereof have been achieved.

While one embodiment of the invention has been completely illustrated and described herein, it will be appreciated that modifications thereof may be made without departing from the scope of the invention as defined in the appended claims.

What is claimed is:

1. That method of forming cellular rubber articles having high tensile strength comprising frothing latex, the latex having vulcanizing and gelling agents therein, placing the latex froth in a vented mold, gelling the latex to form cellular rubber, setting up a vacuum in the mold, heating the mold to about 180° to drive out the water contained in the gelled rubber, and heating the gelled rubber to about 212° F. to vulcanize same.

2. In a method of forming cellular rubber articles having superior physical properties, the steps of frothing compounded latex, gelling the latex to form a wet cellular rubber gel, applying a vacuum to the wet gel, and heating the gel to the boiling point of water at the reduced pressure on the gel to dry same without appreciable vulcanization occurring, then heating the dried rubber gel at a higher temperature to vulcanize same.

3. In a method of forming cellular rubber articles, the steps of frothing a compounded aqueous rubber dispersion, gelling the rubber dispersion to form wet cellular rubber, setting up a vacuum on the cellular rubber, and vaporizing the water in the cellular rubber to drive it rapidly therefrom at a sufficiently low temperature that the cellular rubber is not vulcanized appreciably during the drying thereof, and heating the rubber to a higher temperature to vulcanize same.

4. A method of forming cellular rubber articles, which method comprises the steps of frothing a compounded rubber dispersion, gelling the rubber dispersion to form cellular rubber which is wet with the material in which the rubber is dispersed, the wet cellular rubber being positioned in a chamber, reducing the pressure in the chamber to below atmospheric pressure, heating the chamber to a temperature appreciably above the boiling point of the dispersing material under the reduced pressure set up in the chamber, which heating boils the dispersing material from the cellular rubber and dries same without raising the temperature thereof above the boiling point of the dispersing material, and continuing to heat the chamber to raise the temperature of the dry rubber and to vulcanize same.

5. A method of forming a cellular rubber article which includes frothing a rubber dispersion, gelling the frothed rubber dispersion to form a wet cellular rubber gel, applying a vacuum to the wet gel while the latter is positioned within a chamber, heating the wet gel by means of superheated steam at the reduced pressure within the chamber, whereby to dry the gel without appreciably vulcanizing the rubber, and then vulcanizing the dry cellular rubber.

6. A method of forming a cellular rubber article which includes the steps of gelling a frothed rubber dispersion in a vented mold to form a wet cellular rubber gel, applying a vacuum to the wet gel while the latter is positioned within a chamber, heating a gas and contacting the mold with the heated gas to raise the temperature of the gel to the boiling point of water at the reduced pressure in the chamber, whereby to dry the gel without appreciably vulcanizing the rubber, and then vulcanizing the dry cellular rubber.

MITCHELL CARTER.